United States Patent
Coffman et al.

(10) Patent No.: US 7,817,634 B2
(45) Date of Patent: Oct. 19, 2010

(54) NETWORK WITH A CONSTRAINED USAGE MODEL SUPPORTING REMOTE DIRECT MEMORY ACCESS

(75) Inventors: Jerrie Coffman, Hillsboro, OR (US); Arlin Davis, Yamhill, OR (US); Sean Hefty, Aloha, OR (US); Roy Larsen, Beaverton, OR (US); William R. Magro, Champaign, IL (US); Robert J. Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 11/479,158

(22) Filed: Jun. 30, 2006

(65) Prior Publication Data

US 2008/0002578 A1 Jan. 3, 2008

(51) Int. Cl.
*H04L 12/28* (2006.01)
(52) U.S. Cl. .................................. 370/392
(58) Field of Classification Search .......... 370/230
See application file for complete search history.

(56) References Cited

U.S. PATENT DOCUMENTS

| | | | | |
|---|---|---|---|---|
| 6,538,997 B1* | 3/2003 | Wang et al. | ............... | 370/241 |
| 7,620,693 B1* | 11/2009 | Mott et al. | ............... | 709/213 |
| 2004/0049591 A1* | 3/2004 | Fan et al. | ............... | 709/230 |
| 2004/0064578 A1* | 4/2004 | Boucher et al. | ............ | 709/236 |
| 2005/0002388 A1* | 1/2005 | Gao | ............... | 370/389 |
| 2005/0015426 A1 | 1/2005 | Woodruff et al. | | |
| 2005/0060558 A1* | 3/2005 | Hussain et al. | ............ | 713/189 |
| 2005/0074007 A1* | 4/2005 | Samuels et al. | ............ | 370/392 |
| 2005/0144310 A1* | 6/2005 | Biran et al. | ............... | 709/234 |
| 2005/0256976 A1* | 11/2005 | Susairaj et al. | ............ | 710/3 |
| 2006/0067346 A1* | 3/2006 | Tucker et al. | ............... | 370/412 |
| 2006/0101140 A1* | 5/2006 | Gai et al. | ............... | 709/224 |
| 2006/0101185 A1 | 5/2006 | Kapoor et al. | | |
| 2006/0168086 A1* | 7/2006 | Kagan et al. | ............... | 709/207 |
| 2006/0294234 A1* | 12/2006 | Bakke et al. | ............... | 709/225 |
| 2007/0162559 A1* | 7/2007 | Biswas et al. | ............... | 709/216 |

OTHER PUBLICATIONS

Davis—U.S. Appl. No. 09/397,850, filed Sep. 17, 1999.
Coffman et al—U.S. Appl. No. 09/576,038, filed May 23, 2000.
ASI-SIG—Dec. 2004—Simple Load/Store (SLS) Specification R1.1 RC Specification 96 pages.

(Continued)

*Primary Examiner*—Melanie Jagannathan
*Assistant Examiner*—John Blanton
(74) *Attorney, Agent, or Firm*—Blakely, Sokoloff, Taylor & Zafman LLP

(57) ABSTRACT

Remote direct memory access over a network uses a constrained usage model. In one embodiment, a method of accessing memory on a network comprises a first node of the network generating a remote direct memory access request to remotely access application-level memory on a second node of the network. The first node sends the request in a packet over the network to the second node, the sending being performed in accordance with a constrained usage model. In a further embodiment, constrained usage model comprises sending the packet in an Ethernet protocol packet over an Ethernet network, the Ethernet protocol packet having a OSI layer two header, but not a layer three header.

18 Claims, 18 Drawing Sheets

OTHER PUBLICATIONS

Krishnan et al StarGen, Inc.—ASI-SIG Advanced Switching Interconnect SIG—Comparing TCP/IP Ethernet with Advanced Switching for Intra-System.

Scali High Performance Clustering—Scali Manage Standardized cluster management for heterogeneous environments—2 pages.

Woodget—Scali High Performance Clustering—Scali MPI Connect Single interconnectindependent MPI across high performance clusters—2 pages.

Huse et al—2003—LNCS 2840, pp. 294-301—The Network Agnostic MPI—Scali MPI Connect.

Longmire—Interconnect Strategies Comparing Architectures—Comparing the PCI Bus, 3GIO and the InfiniBand Architecure—14 pages.

Woodruff—Get Acquainted with the InfiniBand Software Architecture and How Support for it has been Added to Linux—http://www.openib.org/doc.html—10 pages.

Acosta—Jun. 2001—V. 1.0—2001 Lane15 Software, Inc.—Introduction of InfiniBand Management—6 pages.

Romanow—Cisco Systems—2003—An Overview of RDMA Over IP—pp. 1-22.

Mellanox Technologies Inc.—2003—Rev 1.90 White Paper Document # 2003WP—Introduction to InfiniBand—pp. 1-20.

Recio—Power Point Presentation Apr. 29, 2003—RDMA Enabled NIC (RNIC) Verbs Overview—28 pages.

Pinkerton—Power Point Presentation Oct. 24, 2003—Sockets Direct Protocol V1.0 RDMA Consortium—pp. 1-32.

Curry—RDMA Consortium Completes Protocol Specifications—2 pages.

Lee—Power Point Presentation—System Engineering, Vitesse—Multi-processing Solutions Using Advanced Switching—pp. 1-29.

Rooholamini—U.S. Appl. No. 11/442,822, filed May 30, 2006.

Kapoor—U.S. Appl. 11/097,891, filed Mar. 31, 2005.

* cited by examiner

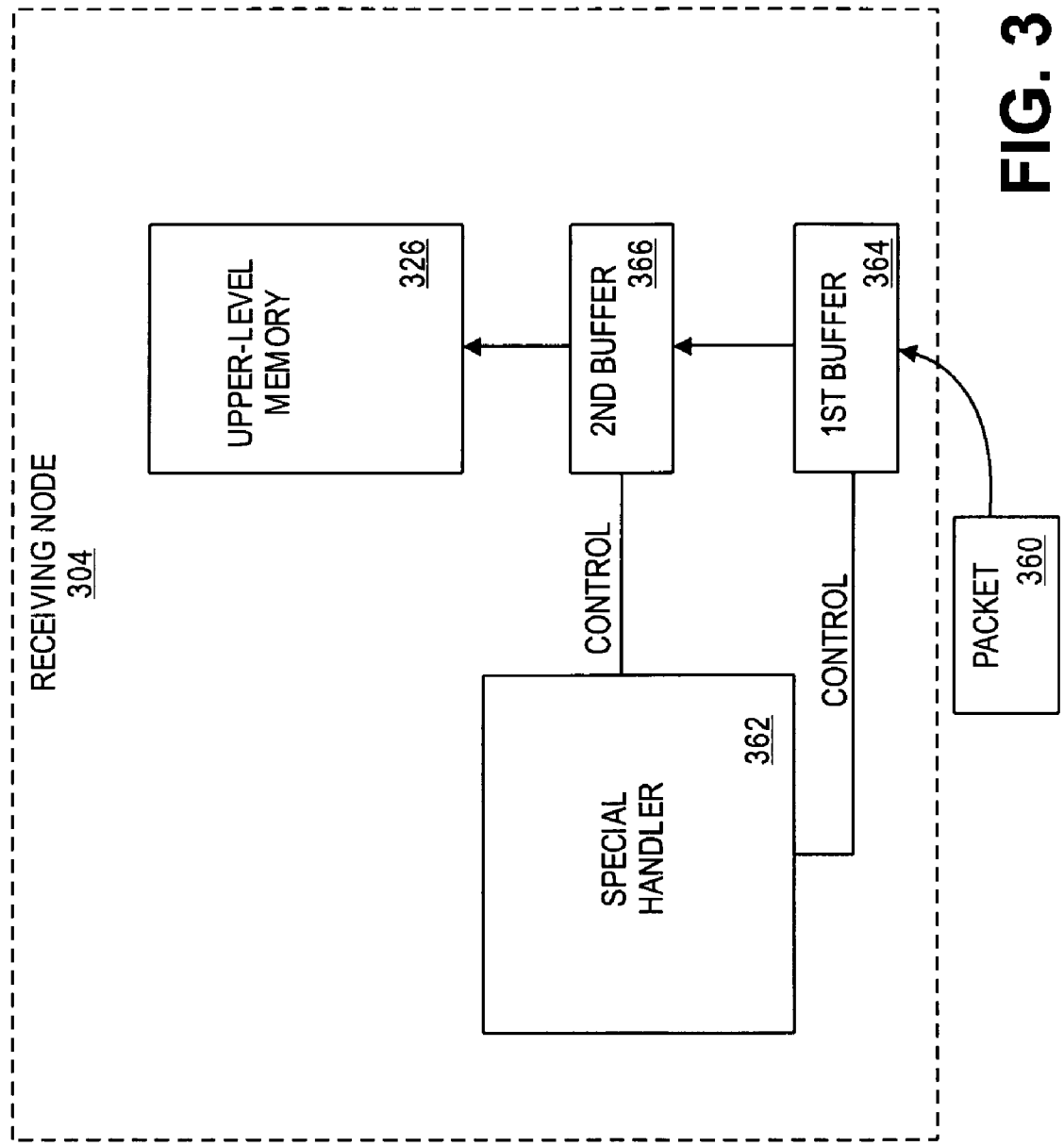

RDMA READ RESPONSE HEADER

RDMA READ REQUEST HEADER

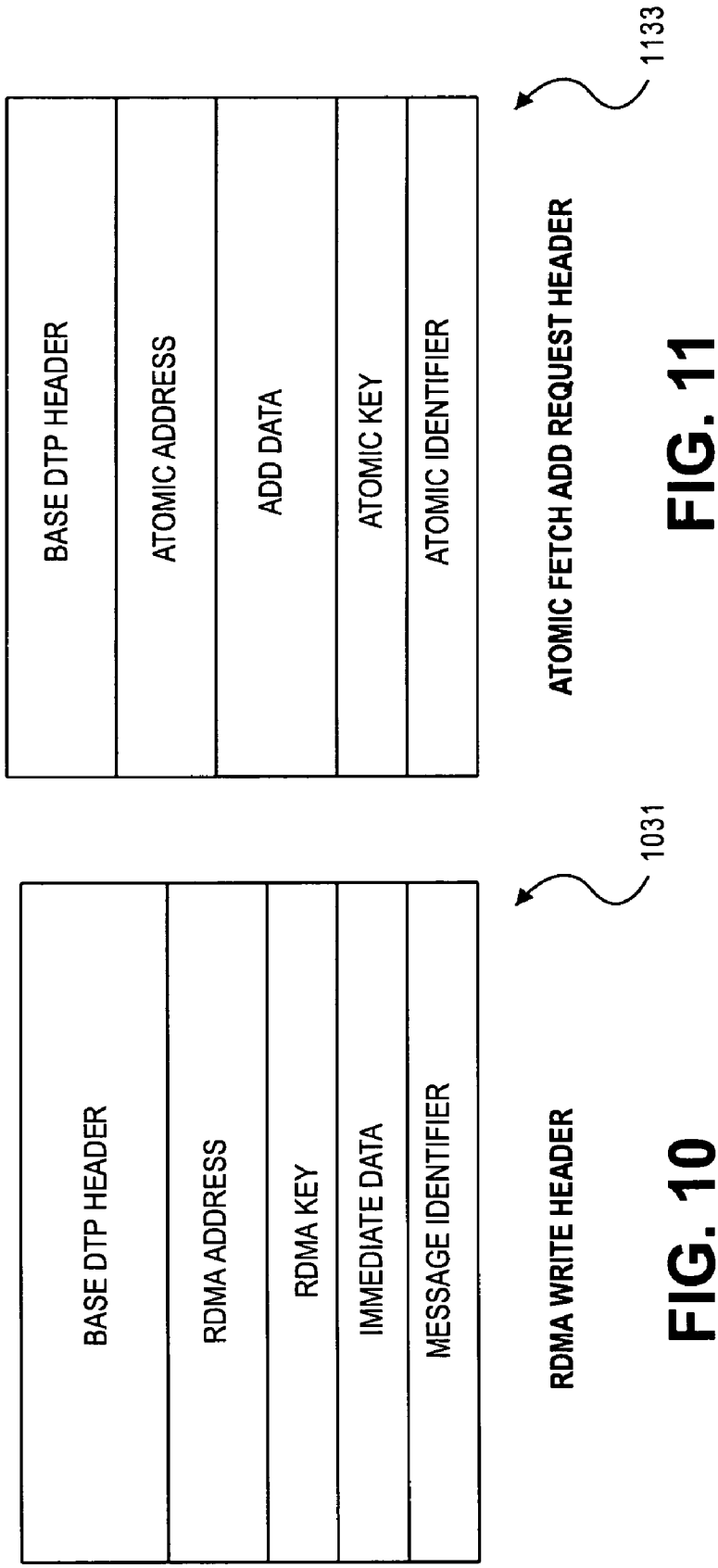
FIG. 10 RDMA WRITE HEADER
FIG. 11 ATOMIC FETCH ADD REQUEST HEADER

EXPLICIT ACK HEADER
BASE DTP HEADER

SELECTIVE NACK HEADER
BASE DTP HEADER | HIGH EDGE ACKNOWLEDGMENT NUMBER

DISCONNECT HEADER
BASE DTP HEADER | REASON CODE

NETWORK WITH A CONSTRAINED USAGE MODEL SUPPORTING REMOTE DIRECT MEMORY ACCESS

BACKGROUND

1. Technical Field

One or more embodiments of the present invention generally relate to networks supporting remote direct memory access. More particularly, certain embodiments relate to networks with a constrained usage model.

2. Discussion

On a network with multiple nodes (for example, computers), an application on one of the nodes may generate a request to read or write to upper-level (for example, application-level) memory on another node of the network. These remote read and write operations generally result in data being transferred from one node to another over the network. In designing networks, one of the considerations has been the speed at which these remote read and write operations may be performed. However, in some cases, these remote read and write operations involve making kernel or other intermediate copies of the data being transferred. The making of intermediate or kernel copies generally slows remote read and write operations, which increases latency.

Remote direct memory access (RDMA) allows remote reads and writes to be performed on a network, while minimizing the making of intermediate copies of the data being transferred between nodes. In some implementations of RDMA, reads and writes involve establishing a connection over the network between a queue pair on a first node and a queue pair on a second node. A queue pair generally comprises at least a send queue (SQ) and a receive queue (RQ). Then, data being sent from a node is sent from the SQ and data being received by a node is received at the RQ. The queue pair may be referred to as a work queue. Application requests to access remote memory may be placed in a queue pair as work queue events. Other types of queues may also be present. For example, there may be a completion queue to communicate the completion of work queue events.

Some RDMA packets may carry data and others (for example, a read request) may not. An RDMA data packet flowing from one node to another may be referred to as a protocol data unit (PDU).

One of the design issues for networks implementing RDMA is the architecture of both the network itself and the nodes on the network. Another design consideration is the protocol that is used over the network to move data from one node to another. Both the architecture and the protocol used may influence the speed and the reliability of remote reads and writes over the network.

BRIEF DESCRIPTION OF THE DRAWINGS

Various advantages of embodiments of the present invention will become apparent to one skilled in the art by reading the following specification and appended claims, and by referencing the following drawings, in which:

FIG. 3 is a block diagram of a portion of an exemplary node according to one embodiment of the present invention.

FIG. 10 is a diagram of a packet RDMA write header according to one embodiment of the present invention.

FIG. 11 is a diagram of a packet atomic fetch add request header according to one embodiment of the present invention.

DESCRIPTION

Figure 1:
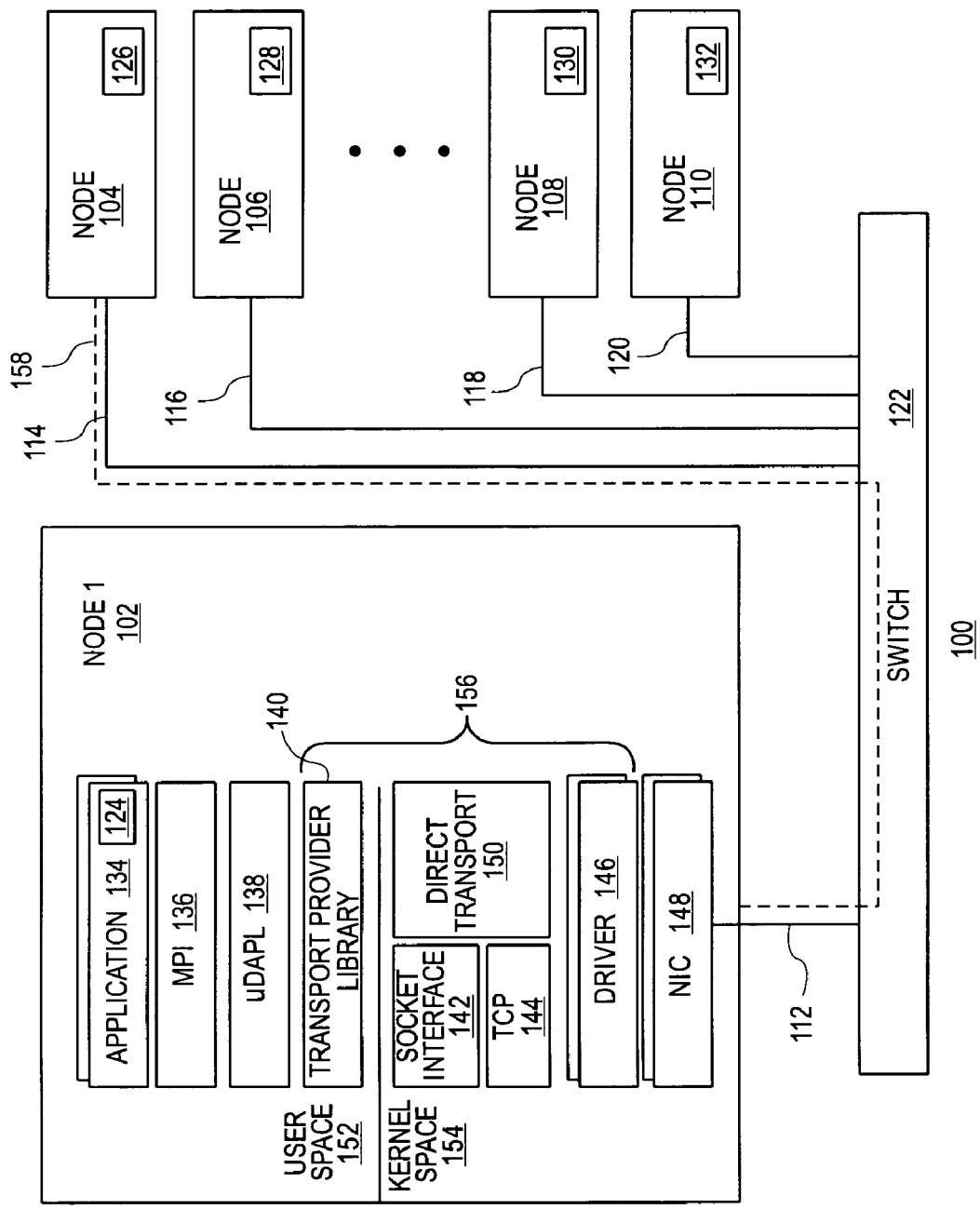
FIG. 1 is a block diagram of a network and an exemplary node according to one embodiment of the present invention.

Certain described embodiments may use a light-weight network and node architecture to generate, process, and convey remote direct memory access (RDMA) requests. Some embodiments use a light-weight, reliable, network protocol to convey RDMA requests. Certain architectures and protocols may reflect the use of a constrained usage model in which architectures and protocols are simplified.

In this description, the term "request" has its usual meaning and includes all manner of requests relating to remote direct access of memory on a network. For example, a request, depending on the context, may refer to one or more of a send request, an RDMA read request, an acknowledgement, a request for an atomic procedure or any other type of request. Some requests have accompanying data. For example, a write request may identify or include data to be written. A read request may not include data, but may identify a memory location with data to be read. A response to a read request may include data to be read, and so on. When the term request is used, it should be understood that, depending on context, that the request may identify or include data.

With respect to some embodiments, different network layers are discussed. The layers referred to are those of the seven-layer model of the Open Systems (OSI) Interconnection Reference Model. This is a layered abstract description for communications and computer network protocol design, developed as part of the Open Systems Interconnection Initiative of the International Organization for Standardization (ISO). These layers include layer 1 (physical layer), layer 2 (data link layer), layer 3 (network layer), layer 4 (transport layer), layer 5 (session layer), layer 6 (presentation layer), and layer 7 (application layer). Together, these layers may be regarded as comprising a "protocol stack."

Certain embodiments refer to Ethernet or Ethernet protocol. As used in this application, Ethernet protocol refers to a protocol or implementation compatible with IEEE 802.3 (1985).

The term "application" has its usual meaning and includes a wide variety of programs, libraries, and executables that operate at least partly in user-space in a computing environment. Depending on context, "application" may also comprise an operating system, adaptation layer, or proprietary device. Similarly, the term "application-level" has its usual meaning and comprises a level of a system or protocol at which an application may function. The terms "application-level" or "upper-level" memory have their usual meaning and comprise memory associated with an application.

Referencing FIG. 1, in one embodiment a network 100 may comprise nodes 102-110, for example, computers, network devices, or other devices comprising network interface hardware. The respective nodes 102-110 may be coupled to a switch 122 (or other OSI layer 2 device) by a physical layer of links 112-120, which may be, for example Ethernet cables or other physical medium. In a particular implementation the physical layer may be Ethernet, PCI (peripheral component interconnect), ATM (asynchronous transfer mode), firewire or other type of physical layer that supports packet-based networks.

The nodes may support RDMA semantics. RDMA semantics are defined by, for example: Virtual Interface Architecture Specification Version 1.0, Dec. 16, 1997, Compaq Computer Corp., Intel Corp., Microsoft Corp.; InfinitiBand® Architecture Specification Release 1.2, Oct. 5, 2004, InfinitiBand® Trade Association; and the RDMA Protocol Specification (Internet Draft), Jul. 17, 2005, Remote Direct Data Placement Work Group, the Internet Engineering Task Force (IETF). These semantics generally support application-level access by one node of upper-level memory on a remote node while minimizing the making of intermediate copies (such as, for example, kernel copies) of the accessed data. The semantics may include by-passing kernel logic.

Returning to FIG. 1, a node 102 may comprise user-space 152 and kernel-space 154. Nodes 102-110 may post upper-level memory 124-132 for application-level access by other nodes of network 100, for example by application 134 of node 102.

The upper-level memory may be posted for two types of access by applications. First, the memory may be posted for sequential access in which the node hosting the memory manages the memory accesses and the memory is accessed sequentially. In this case, the receiving node may not post the memory address of the posted memory. Memory posted in this manner may be accessed, for example, by a "send" operation.

Second, the memory may be posted for random access in which the node accessing the memory may specify a location within the posted memory to be accessed. In this case, the memory address may be posted and requests to access the memory may provide a starting address of the memory to be accessed, plus an offset from that starting address. Memory posted in this manner may be accessed, for example, by RDMA read or write operations.

An RDMA request may begin with the generation of an application-level request on a node to access application-level memory on another node of the network. For example application 134 on node 102 of FIG. 1 may generate a request to access upper-level memory 126 on node 104. The generation of the request may include the use of a message passing interface library (MPI) 136 of node 102 to communicate through a User Direct Access Provider Library (uDAPL) 138.

MPI 136 may be an implementation of, for example, Message Passing Interface standards adopted by the Message Passage Interface Forum, an industry group. These standards include MPI 2.0. MPI standards have been implemented by a variety of software vendors. Nodes on a network may use messages for non-blocking communication for numerous purposes. However, other methods of communication among nodes in a network are known in the industry.

uDAPL 138 may be an implementation of, for example, the uDAPL version 1.2 (2005) specification defined by the Direct Access Transport ("DAT") Cooperative, an industry group. Generally, uDAPL 138 provides an application program interface (API) for RDMA. Other types of interface may also be used, including an interface directly provided by a library, for example, transport provider library 140 discussed below.

Referring again to FIG. 1, uDAPL 138 may interface with a transport provider library (TPL) 140. In a particular embodiment, TPL 140 is a dynamically-loaded library implementing a user-space portion of network logic 156, described below. In response to the RDMA request communicated through uDAPL 138, TPL 140 may initiate opening a connection with another node on the network, for example, between node 102 and remote node 104 of FIG. 1. The connection 158 may then be used to forward the request over the network 100 to node 104.

In one embodiment, TPL 140 may initiate the opening of the connection by using a socket interface 142 for TCP 144 (Transmission Control Protocol, originally defined in Request For Comment (RFC) 793 (1981), IETF). In a further embodiment, a connection may be opened by establishing a queue pair connection to the remote note.

For example, TPL 140 may establish the queue pair connection by performing address resolution and connection setup through socket interface 142. TPL 140 uses socket interface 142 to exchange information with a TPL on the remote node (for example, node 104). The two nodes may use socket interface 142 to exchange their respective media access control (MAC) addresses and queue pair numbers. Then, having acquired information with which to establish a connection, both nodes may make system calls to their respective direct transport logic (DT). For example TPL 140 node 102 may make a system call to Direct Transport (DT) 150 of FIG. 1. The DT's reside in the kernel of their respective nodes. The system calls result in the DT's modifying their respective queue pairs to set the MAC address and queue pair numbers to be used for the connection. The queue pairs may then be transitioned from idle to active states to establish the connection.

The above is just one method of establishing a connection between a node and a remote node. Dependent upon the operating system used and the specifics of how the network is configured, other methods of establishing a connection may be used. For example, instead of TCP another transport layer service may be used for instance, the User Datagram Protocol (UDP), specified in IETF Request for Comments 768 (1980).

In another implementation, a database may store information for the DT's to establish a connection for example, the MAC addresses and queue pair numbers of remote nodes. A DT may obtain connection information from the database and then directly connect with a remote node through a DT module on the remote node.

In another implementation, a DT may comprise logic to directly exchange connection information with another DT using protocol connection packets. In this implementation, DT's could therefore establish a connection without use of a third-party service, such as, for example, TCP, UDP or a database.

Once there is a connection, the RDMA request may bypass socket interface 142 and TCP 144. The DT's, and not TCP 144, may handle resource management, validation, data fragmentation and placement, retransmissions, and movement of data to or from memory posted by user-level applications. In one embodiment, the DT's perform these tasks using a constrained usage model that comprises using a light-weight, reliable, transport protocol described below.

In one implementation, DT 150, interfaces with driver 146 and network interface hardware (NIC) 148 to place the request, including any data portion, in one or more packets on the network 100. NIC 148 may include or be coupled to a jack, such as, for example, an Ethernet cable jack to attach to an Ethernet cable. TPL 140, DT 150, and driver 146 may collectively comprise network logic 156. In a particular implementation, network logic 156 may be implemented in software. Or, as discussed below in reference to FIGS. 17, 18 and 19, at least a portion of network logic 156 may be implemented in hardware.

The above processing of the application-level request may, in one embodiment, be performed without making kernel copies of the request, including any data portion of the request. In particular embodiments, data may be copied directly from upper-level memory 124 to a packet to travel over the network.

Figure 2:
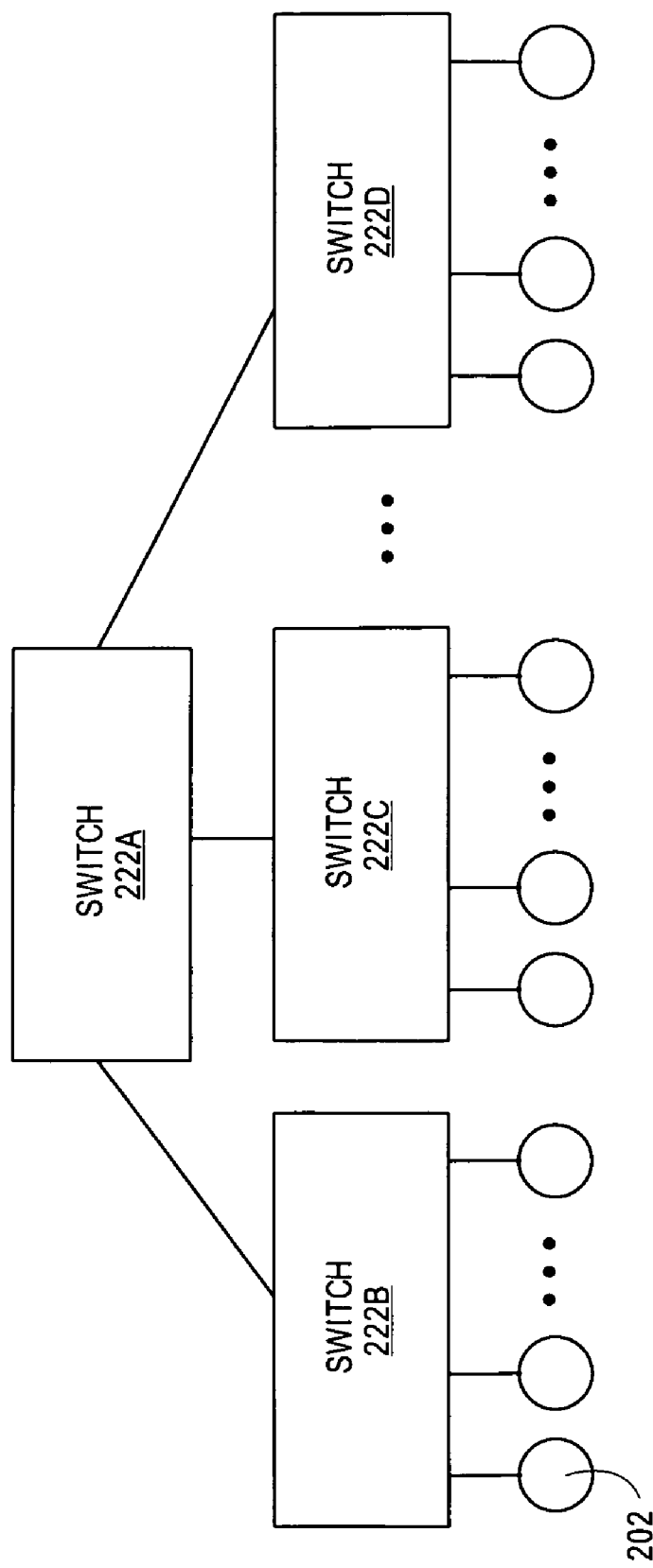
FIG. 2 is a diagram of a network topology according to one embodiment of the present invention.

Returning to FIG. 1, at the physical layer of network 100, a possible packet route comprises travel through link 112, to switch 100, to link 114 and to remote node 104 over the connection 158. A variety of routes and topologies are possible. For example, referencing FIG. 2, a topology may comprise switches 222A-222D arranged in a tree topology. A plurality of nodes may then be coupled to their respective nodes, for example, node 202. In another variation, a single link may be coupled to the switch on one end and then coupled to two or more nodes along its length. These are mere examples, other topologies are possible.

Referencing FIG. 3, a packet 360 arriving at a receiving node 304 may comprise all or part of a request, including any data portion of the request, to access upper-level memory 326 of node 304. Details regarding packets are discussed below with reference to FIG'S. 5A-17. However, in one implementation, the packet 360 or series of packets comprise headers with sufficient information to allow direct access to upper-level memory 326 of remote node 304.

In one embodiment, under RDMA semantics, requests being received by remote node 304 always have a place to go. That is, the receiving node 304 may be required to have resources to process all incoming requests. An error may be generated upon the arrival of a packet for which there is no buffer space. In a further embodiment, node 304 may have resources to receive packets arriving at a rate that uses the full bandwidth of the physical layer, that is at the full wire rate. An assumption that a receiving node has this capability may be a part of a constrained usage model discussed below with reference to FIG. 4A.

In one embodiment packet 360 may be received through the protocol stack to a special handler 362 registered with the operating system of remote node 304. Under one software embodiment, two buffers 364, 366 may be used to receive and process requests: 1) A first buffer 364 to receive data; and 2) A second buffer 366 to contain previously received requests. Processing of the request is performed from the second buffer without kernel copies. For example, in a write request, the data portion of the request may be written directly from the second buffer 366 to pre-posted upper-level memory 326 in accordance with the write request.

Figure 4A:
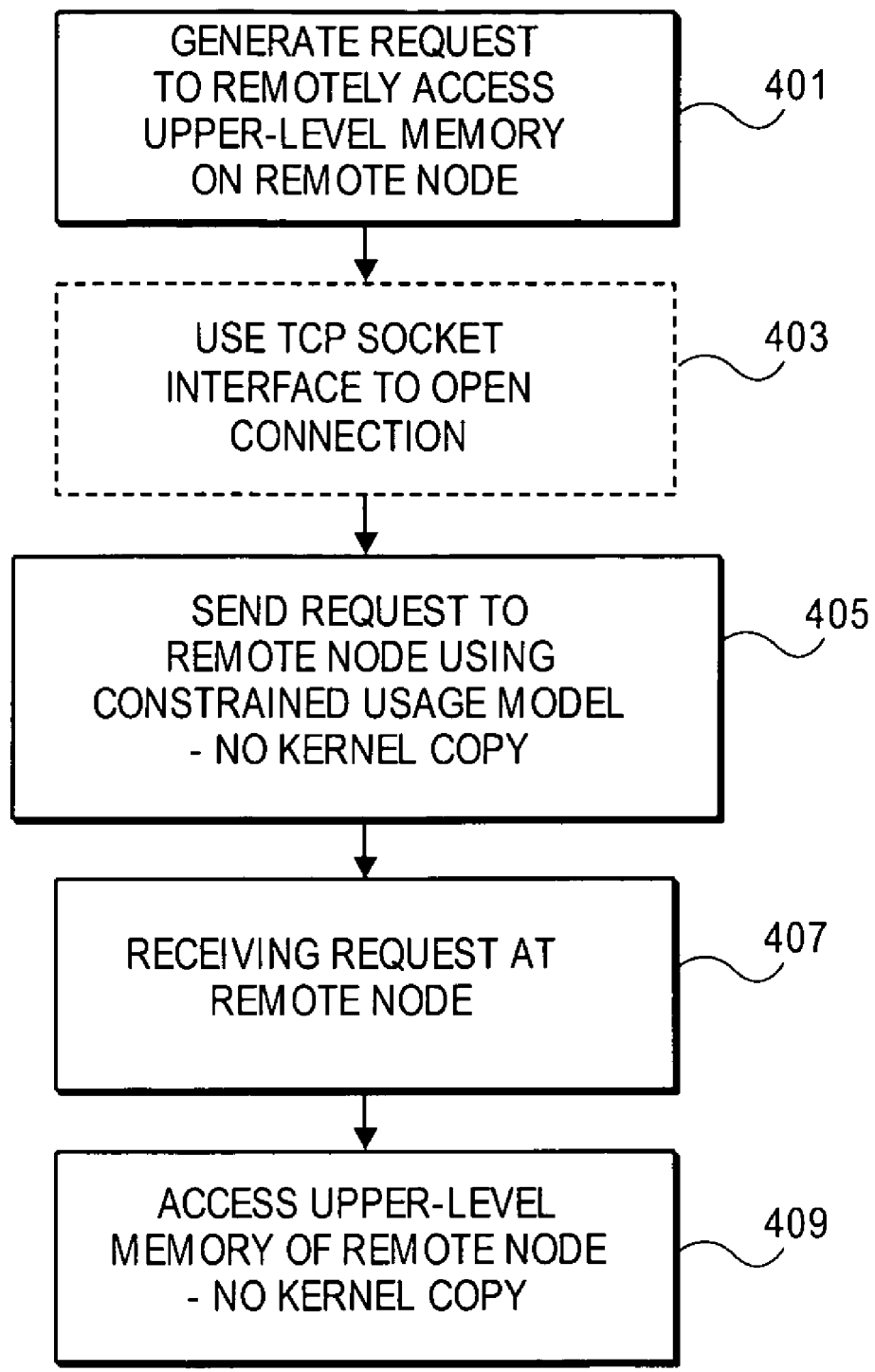
FIG. 4A is a flow chart illustrating a method of accessing remote memory according to one embodiment of the present invention.

Referencing FIG. 4A, a method of accessing memory on a network may comprise generating, on a node of the network, an upper-level request to remotely access upper-level memory on another, remote, node of the network. (Process Block 401). This request may be made in accordance with a specification for RDMA, as discussed in reference to FIG. 1.

The request may further be made through an API for RDMA, for example, uDAPL 138 of FIG. 1. Through the API, the application may utilize a user-space transport provider library user-space library (TPL), for example, TPL 140 of FIG. 1.

However, in another embodiment the TPL may provide an interface that is directly accessible to an application, without the use of uDAPL or other API separate from the library itself. Use of uDAPL or a similar separate API module is a matter of design or programming convenience.

In one embodiment, the TPL proceeds to open a connection with the remote node. Optionally, the TPL may use a TCP socket interface or other means to open a connection to the remote node, as discussed in reference to FIG. 1. (Process Block 403, FIG. 4A).

In one embodiment, once a connection to a remote node is established, the request, and any accompanying data, is sent to the remote node using a constrained usage model. (Process Block 405, FIG. 4A). This is performed without making a kernel copy.

In one embodiment, a constrained usage model may be based on assumptions, such as, for example, that data loss is rare, that robust network security is not needed, that packets rarely arrive out of order or that the receiving node may receive packets at the full wire rate. These assumptions may allow the use of a constrained usage model that decreases complexity and overhead sometimes associated with RDMA.

In one embodiment, a constrained usage model may comprise using a light-weight, reliable transport protocol as described below. In some embodiments of the protocol may be managed by direct transport logic, for example DT 150 of FIG. 1. Some embodiments of the protocol may be referred to as direct transport protocol (DTP).

In one embodiment, DTP may include using a static transmit window for flow control. Data packets, which may be referred to as protocol data units (PDU's), carry sequence numbers.

Figure 4B:
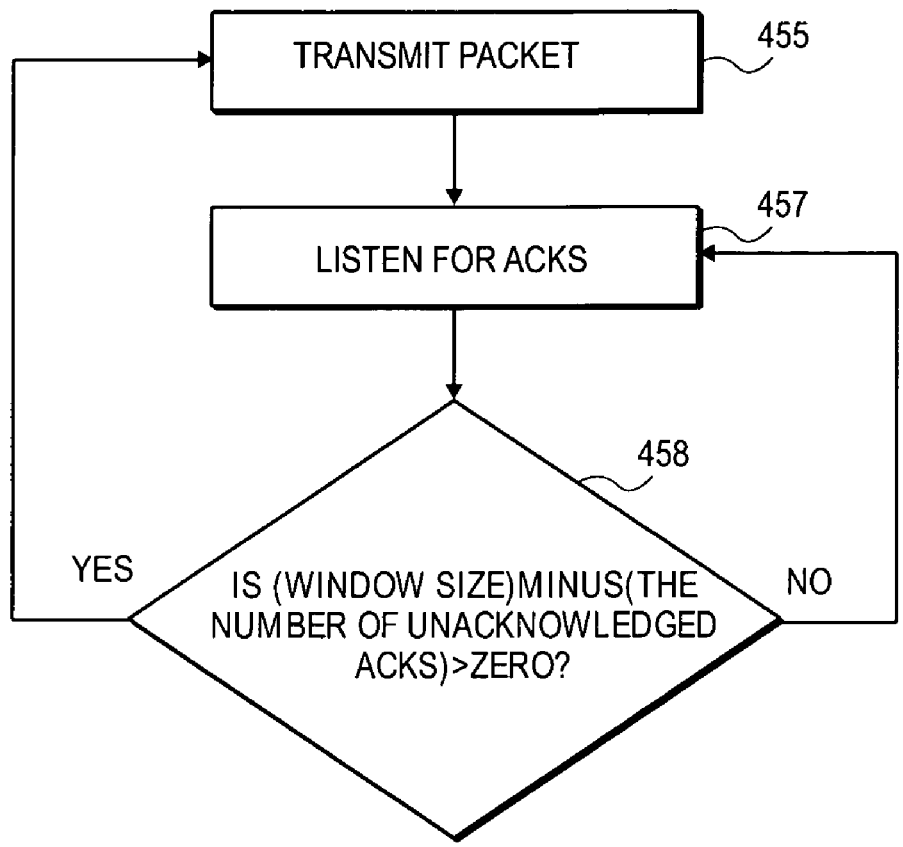
FIG. 4B is a flow chart illustrating a method of flow control that comprises using a static transmit window, according to one embodiment of the present invention.

Referencing FIG. 4B, in one method embodiment, DTP may allow a configurable number of PDU's to be unacknowledged before it stops and waits for their acknowledgment. A node may transmit one or more packets (Process Block 455, FIG. 4B), while listening for acknowledgments ("ACKS"). (Process Block 457, FIG. 4B). When ready to transmit another packet, the node may test whether a configurable, pre-determined window size, minus the number of unacknowledged packets, is greater than zero. (Process Block 458, FIG. 4B). If no, then it does not transmit the packet, but instead listens for acknowledgements ("ACKS"). (Process Block 457). If yes, it transmits the packet. (Process Block 455). These actions may not be performed in any particular sequence and could for example, be performed in different sequences or concurrently, perhaps using different threads.

Figure 4C:
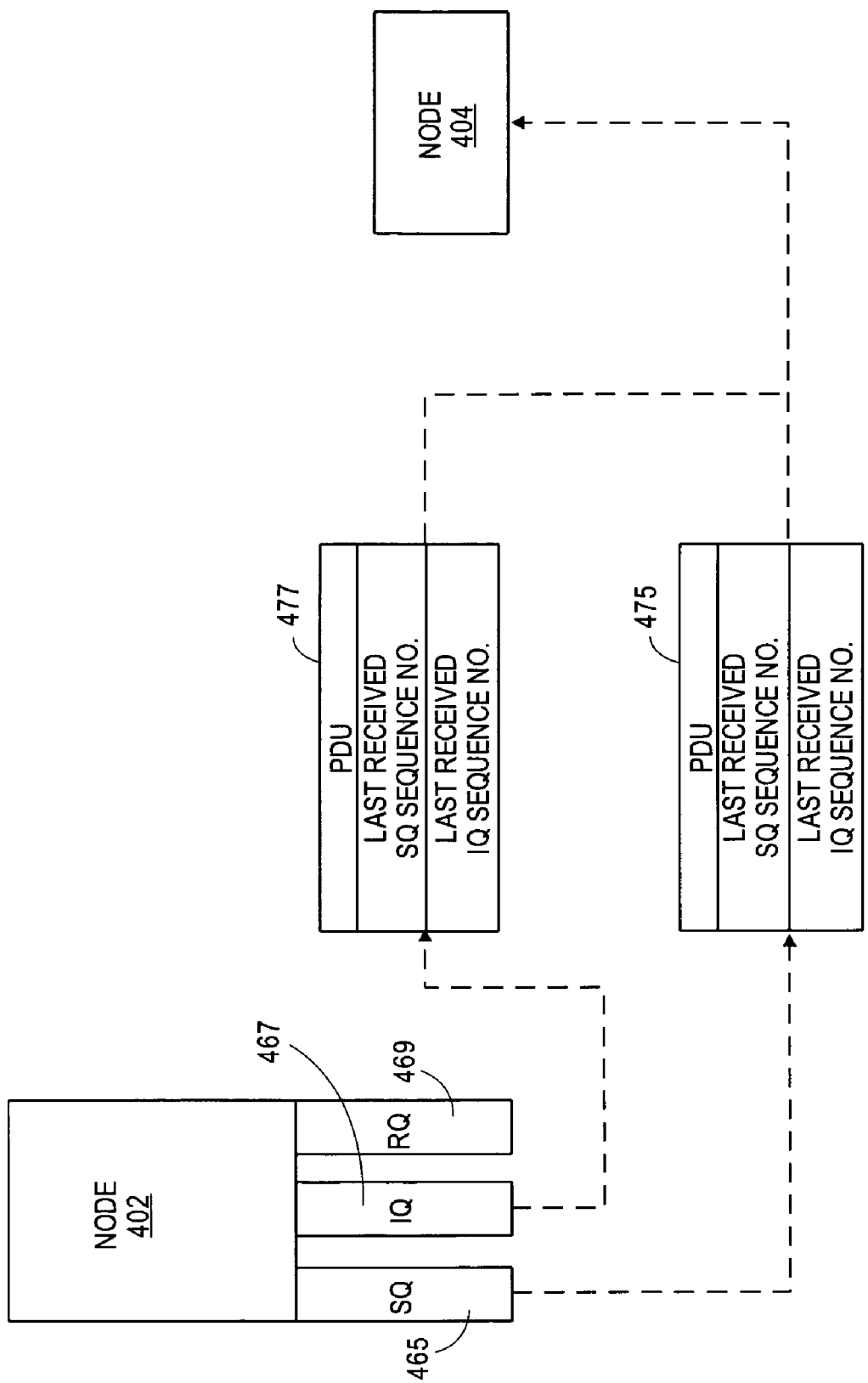
FIG. 4C is a flow chart illustrating a method of piggybacking packet acknowledgements, according to one embodiment of the present invention.
Figures 6, 7:
FIG. 6 is a diagram of a packet base header according to one embodiment of the present invention.
FIG. 7 is a diagram of a packet send header according to one embodiment of the present invention.

Referencing FIG. 4C, in one embodiment, a node 402 comprises send queue (SQ) 465, inbound queue (IQ) 467, and receive queue (RQ) 469 and is associated with two data streams, and thus two transmit windows—one for a send stream and one for a response stream. A "send" stream may comprise packets (for example, PDU 475) leaving its SQ 465 and carrying send messages (described below in reference to FIG. 7) and RDMA write data to remote node 404. A "response" data stream may comprise packets (for example, PDU 477) leaving from its IQ 467 and may carry RDMA read response data and atomic return data (described below in reference to FIG. 13). This, "response" stream may comprise packets sent in response to earlier read and atomic requests received from remote node 404. There may not be any data stream associated with packets leaving RQ 469. Therefore, a given data packet may comprise two sequence number spaces because these are two separate data streams—one associated with the SQ and one with the IQ. An example of a packet comprising SQ and IQ sequence numbers is depicted in FIG. 6 showing regarding a DTP base header.

In another embodiment, no flow control may be used—perhaps under an assumption that nodes may receive packets at the full wire rate.

Further referencing FIG. 4C, in one embodiment, DTP may use a piggyback acknowledgment method in which node 402 sends PDU's 475, 477 that carry the last received in-sequence SQ data sequence number and the last received in-sequence IQ data sequence number for packets received from remote node 404.

In one embodiment, DTP may automatically send explicit ACKs at intervals of, for example, ¼ of the configurable window value to cover traffic patterns that send data in only one direction.

In some implementations, DTP may use selective negative acknowledgements "NACKS" indicating that a packet has been received out-of-sequence. A NACK may indicate the boundary of a "data hole."

In some embodiments, the use of a constrained usage model may also comprise using a data integrity check mechanism that is native to the physical layer being used. For example, in one embodiment comprising an Ethernet network using Ethernet protocol packets, reliance may be placed on the 32-bit Ethernet cyclic redundancy check (CRC) for end-to-end data integrity checking (See, for example, CRC field in packets of FIGS. 5A and 5C, discussed below). More sophisticated data integrity check technology may not be used. This may be based on an assumption, for example, that data corruption is rare.

In one embodiment, the use of a constrained usage model may comprise sending packets without a network security protocol. For example, Internet Protocol Security (IPsec) (specified in IETF Request for Comments 2404(1988)) may not be used. The lack of a network security protocol may be based on an assumption that high security is not needed. This may be the case, for example, in a network screened from the outside by a firewall.

In some embodiments, a constrained usage model may also comprise a reliance on OSI layer 2 (data link layer) routing protocols, addressing, and devices. That is, a network may use a routing protocol that is native to the type of physical layer being used. For example, a particular Ethernet network implementation may rely on Ethernet protocol headers, MAC addresses, queue pair numbers, and switches. Layer three routing protocols and headers may not be used. Thus, packets may not have Internet Protocol (IP) (RFC 791, IETF (September 1981)) or other OSI layer three headers.

In one embodiment, the packets may comprise IP headers, and the constrained usage model may comprise use of the DTP transport headers with the IP headers. In other embodiments, other types of OSI layer 2 or layer 3 packet headers may be used with DTP. DTP and its underlying principles could be used in packet-based networks in general.

Continuing with reference to FIG. 4A, in one embodiment, receiving requests at the remote node (Process Block 407) may be performed at a rate up to the maximum physical layer rate. Upper-level memory of the remote node may then be accessed consistent with the packet request, without making a kernel copy. (Process Block 409). The receiving and the accessing may generally be performed consistent with the previous discussion with reference to FIG. 1 and the subsequent discussion with reference to FIGS. 17, 18, and 19.

Some embodiments may use a constrained usage model in small to medium-sized high-performance enterprise clusters. Consistent with a constrained usage model, in at least some high performance clusters, it may be assumed that there is no need for high security, that package loss will be rare and "bursty", that OSI layer 3 routing is not needed, that data received at a node always has a place to go, and that sophisticated data integrity checking is not needed.

Accordingly, in some of these embodiments, a constrained usage model may be used that comprises using a light-weight, reliable transport protocol, such as DTP, not using IPsec, using OSI layer 2 routing (but not layer 3, for example, IP routing), checking for data integrity with Ethernet 32-bit CRC (or similar CRC in non-Ethernet network), and assuming the received data always has to go. However, other embodiments may include one or more of increased security, more robust data integrity checks or use of a layer 3 routing, such as, for example IP routing.

Figure 5A:
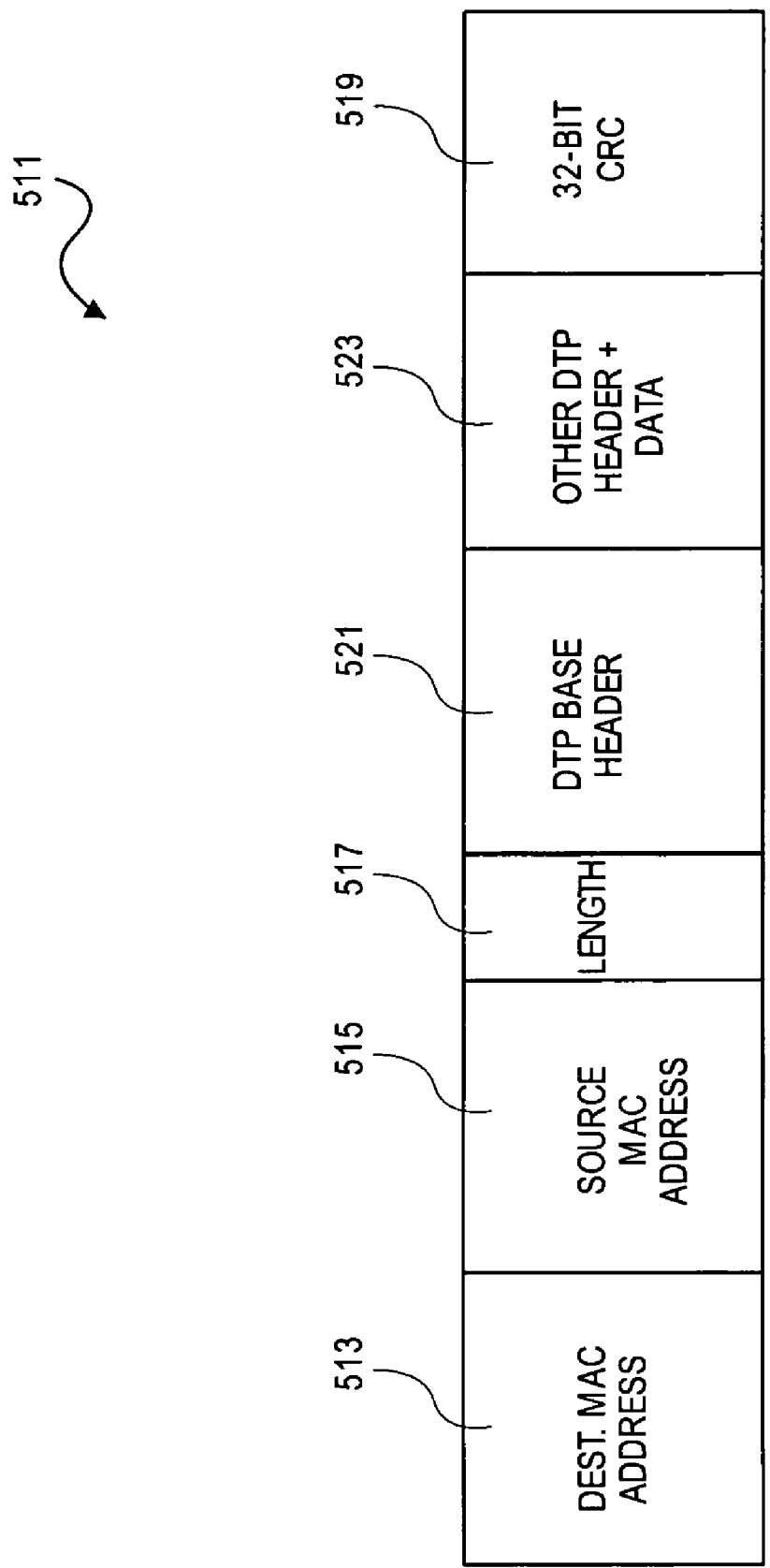
FIG. 5A is a diagram of a network protocol packet according to one embodiment of the present invention.

Referencing FIG. 5A, in one embodiment, a network may comprise an Ethernet network using Ethernet protocol packets, such as, for example, Ethernet protocol packet 511. Consistent with a constrained usage model, in particular implementations, Ethernet protocol packet 511 may have no IP or other OSI layer 3 headers. Ethernet protocol packet 511 may also not have TCP headers. Thus, in these particular implementations, there may be no layer 3 routing or TCP transmission control on the network.

In one embodiment, Ethernet protocol packet 511 may comprise standard Ethernet protocol headers, including, destination MAC address 513, source MAC address 515, length 517, and a 32-bit CRC 519. In a particular implementation, DTP headers may be disposed in packet 511 adjacent the Ethernet protocol headers. These DTP headers may comprise a DTP base header 521, another specific type of DTP header 523 with any data. In some implementations, the base header 521 appears in all DTP packets (such as, for example, packet headers of FIG'S. 7-16). The details of base header 523 are discussed below in reference to FIG. 6. The various types of headers that may be disposed within a packet similarly to header 523 are discussed with reference to FIG'S. 7-16.

In other embodiments, the network may comprise a type of network other than an Ethernet network, such as, for example, a token ring, a PCI network, an ATM network, or other network type.

DTP may be used with other types of physical layers by, for example, using the DTP headers together with the addressing or routing headers native to the particular physical layer protocol being used—perhaps as shown in FIG. 5A.

Figure 5B:
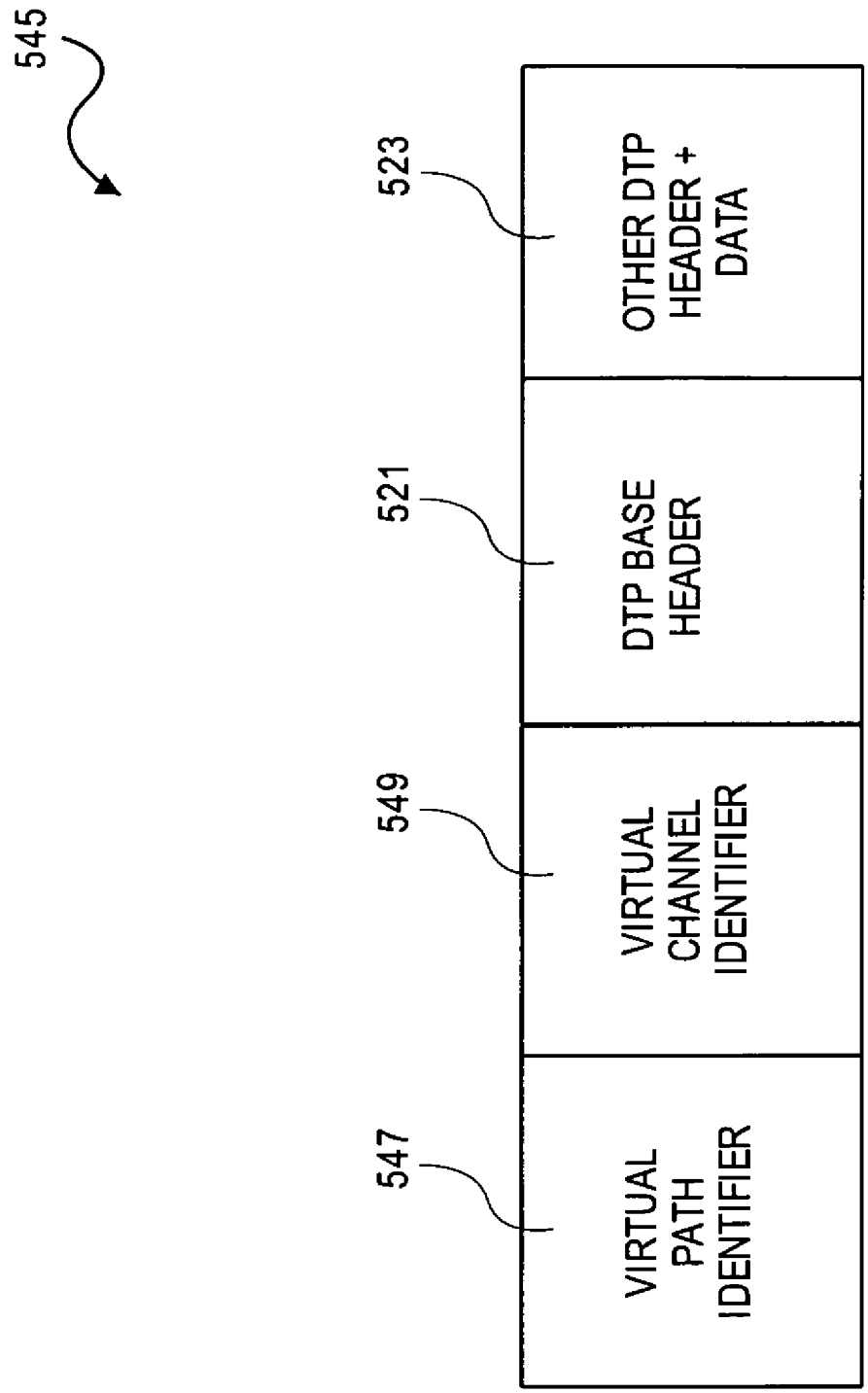
FIG. 5B is a diagram of a network protocol packet according to one embodiment of the present invention.

For example, referencing FIG. 5B, an embodiment may comprise an ATM network using ATM packet 545 (simplified header shown). ATM packet 545 comprises a virtual path identifier 547 and a virtual channel identifier 549 which together identify the next destination for the packet. ATM packet 545 may further comprise DTP Base header 521 and another specific type of DTP header 523 with any data, as discussed above in reference to FIG. 5A.

Figure 5C:
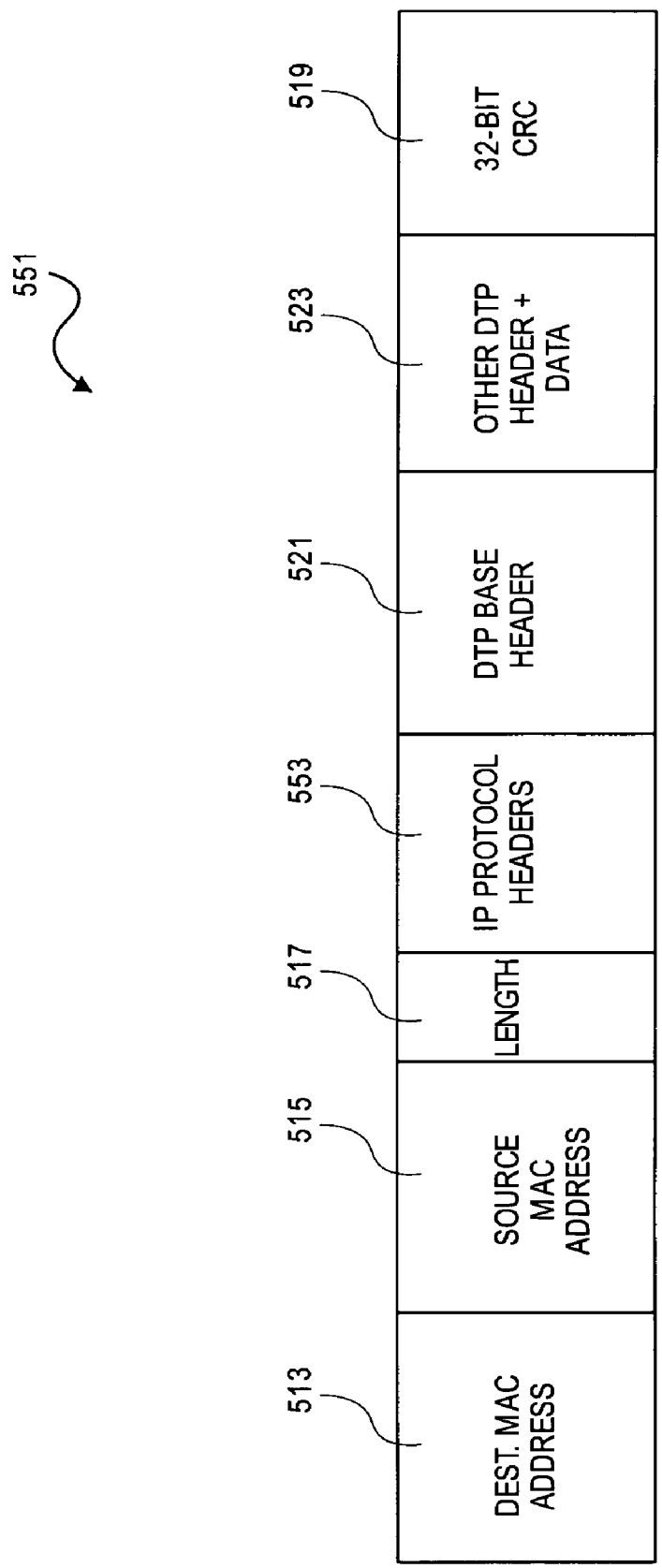
FIG. 5C is a diagram of a network protocol packet according to one embodiment of the present invention.

Referencing FIG. 5C, one embodiment of the network may be an IP or other OSI layer 3 network and may comprise, for example, IP network packet 551. IP network packet 551 may be similar to that shown in FIG. 5A and include destination MAC address 513, source MAC address 515, length 517, DTP base header 521, other DTP header and data 523, and a 32-bit CRC 519. But packet 551 further includes IP protocol headers 553 (or other OSI layer 3 headers) disposed between Ethernet length field 517 and DTP base header 521. In other embodiments, DTP headers may be used in any packet-based networks to provide transport-level service.

In one embodiment, to avoid byte-swapping on little-endian based machines, multi-byte fields of DTP headers may be in little-endian format.

Referencing FIG. 6, in one embodiment, a base header 521 may comprise fields to identify a destination queue pair and a source queue pair. In some Ethernet implementations, these queue pair identifier fields may be used for routing along with, for example, the MAC address fields 513, 515 of packet 511. In some IP network implementations, these queue pair fields may be used for routing along with IP headers.

Base header 521 may further comprise a sequence number field to identify the packet within a stream of packets. A length field may indicate the size of user data following the header, for example, in bytes. An opcode field may indicate optional parameters such as, for example, solicited events or immediate data that may be in the packet. There may also be a flags field. The presence of and the purpose of the above fields may vary depending upon the particular implementation.

The base header may also comprise a send queue acknowledgement number and a "response" or inbound queue acknowledgement number. In some embodiments, these may be used to implement piggybacked acknowledgements as discussed above with reference to FIG. 4C. In some embodiments, such as, for example, the packets shown in FIG'S. 7-16, all DTP packets include a base header 521.

Referencing FIG. 7, in one embodiment, a send header 725 may indicate a remote write operation in which the receiving node controls the location of the remote memory write. For example, a remote node may advertise that a buffer is available for remote writes without explicitly advertising the location of the buffer. Thus, as shown in FIG. 7, a send header 725 may not have address fields to indicate where the memory location to which the send packet's data should be transferred. The receiving node may instead manage the location of the remote write. In one embodiment, for example, the receiving node may write the transferred data sequentially to a pre-posted upper-level memory.

Send packets contrast with RDMA write packets in which the sending node specifies the location within the receiving node where the data is to be written—for example, by providing a starting memory address plus an offset from the starting address. RDMA write packets are discussed further with reference to FIG. 10.

Further referencing FIG. 7, a send header 725 may further comprise a message identifier field and a message offset field. These assist reassembling a larger fragmented packet of which the immediate send packet may have been a part. In that case, the message field may identify a message that the packet is a part of and the offset field may identify the packet's location within that message. A message length field may also be present. The immediate data field may comprise a data payload to be transferred to the pre-posted memory of the receiving node. A send header, as discussed above with reference to FIGS. 5A-C, may be preceded by a base header 521 within, for example, an Ethernet protocol packet, an IP packet, or other packet type.

Figure 8:
FIG. 8 is a diagram of a packet RDMA read request header according to one embodiment of the present invention.

Referencing FIG. 8, in one embodiment, an RDMA read request header 827 may identify a remote memory location to be read. RDMA read requests do not carry data. Instead, they describe the memory to be read and transferred back to the initiator of the request. The memory may be described, for example, in an RDMA address field and an RDMA length field. The RDMA Identifier provides the initiator context with the RDMA request. The intent is to allow matching responses to RDMA requests without requiring strict ordering. This allows direct data placement even in cases of missing packets. The RDMA key field comprises a field associated with the memory to be read. The receiving node may check the key field to verify that the key matches the memory location to be read. There may also be an RDMA length field.

Figure 9:
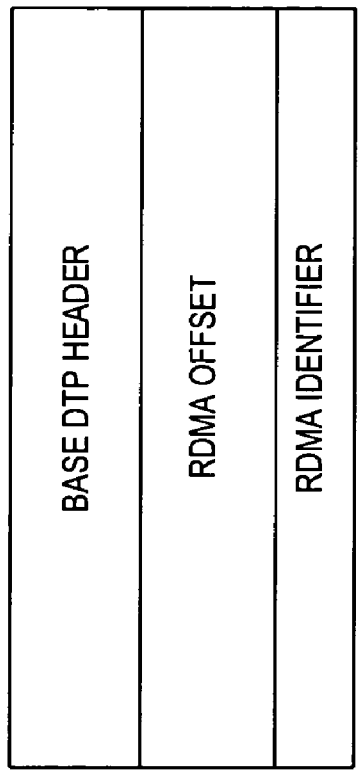
FIG. 9 is a diagram of a packet RDMA read response header according to one embodiment of the present invention.

Referencing FIG. 9, in one embodiment, an RDMA read response header 929 identifies the packet as an RDMA read response and provides parameters. RDMA read response packets transfer data from the destination of an RDMA read request to the source. RDMA read responses are restricted to the size of a single data packet at the wire protocol level. RDMA read operations larger than a single data packet are converted into multiple operations on the wire. The destination of the RDMA read response tracks RDMA read requests and matches a response with the appropriate request. The destination manages the local data buffer where the read data should be placed. The header may include an RDMA offset field and an RDMA identifier, which are known in the art.

Referencing FIG. 10, an RDMA write header 1031 identifies a packet as an RDMA write and provides the memory address in the remote host to which data is to be written. RDMA writes are similar to send operations, but allow the source to specify the destination of the RDMA operation. RDMA write operations are restricted to the size of a single data packet at the protocol level. RDMA write operations larger than a single data packet are supported converted into multiple operations on the wire. This header may include RDMA address, RDMA key, immediate data, and message identifier fields, which are known in the art.

Referencing FIG. 11, one embodiment may support an atomic fetch add and identify such a request with atomic fetch add header 1133. An atomic fetch/add operation performs an atomic read of a remote 64-bit memory location, adds to that value the data supplied in the request, and then writes the result to that same memory location. The original data is returned in an atomic response header, discussed below with reference to FIG. 13. This header may include atomic address, add data, atomic key, and atomic identifier fields, which are known in the art.

Figures 12, 13:
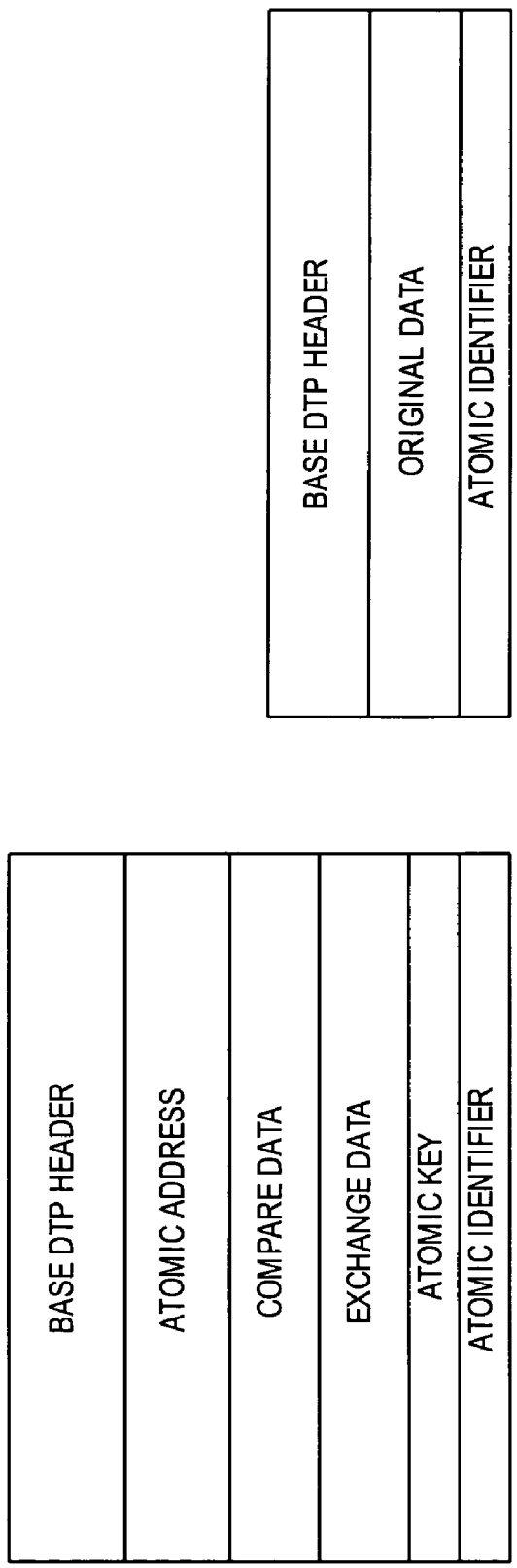
FIG. 12 is a diagram of a packet atomic compare and exchange request header according to one embodiment of the present invention.
FIG. 13 is a diagram of a packet atomic response header according to one embodiment of the present invention.

Referencing FIG. 12, one embodiment may support an atomic compare exchange and identify such a request with an atomic compare exchange request header 1235. In a compare/exchange operation, an atomic compare is performed on the contents of the memory location with the Compare Data. If they match, the Exchange Data is written to that same location, otherwise is not modified. The original data is returned in an atomic response header, discussed below with reference to FIG. 13. This header may include atomic address, compare data, exchange data, atomic key, and atomic identifier fields, which are known in the art.

Referencing FIG. 13, in one embodiment, an atomic response header 1337 returns data from both the fetch/add and compare/exchange requests discussed above with reference to FIG'S. 11 and 12, respectively. The atomic response returns the Atomic Identifier specified in the corresponding atomic request along with the original data stored at the atomic location. The destination of the atomic response tracks atomic requests and matches a response with the appropriate request. The original data field is known in the art.

Figure 14:
FIG. 14 is a diagram of a packet explicit acknowledgement (ACK) header according to one embodiment of the present invention.

Referencing FIG. 14, in one embodiment, an explicit acknowledgement (ACK) header 1439 indicates that all transfers below the acknowledgement number have been successfully received. An Explicit ACK packet may be used in the case of unidirectional transfers; otherwise, acknowledgement information may be included in other packet type headers. The Explicit ACK header 1439 may have the same format as the base header 521.

Figure 15:
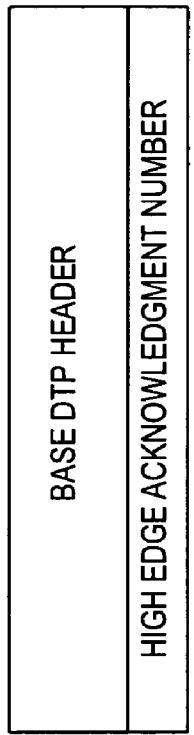
FIG. 15 is a diagram of a packet selective negative acknowledgement (NACK) header according to one embodiment of the present invention.

Referencing FIG. 15, in one embodiment, a selective negative acknowledgement header 1541, as previously discussed with reference to FIG. 4A, indicates a range of sequence numbers that have not been received. The intent is to reduce latency by requesting re-transmission of the lost data as soon as possible. This header may include a high edge acknowledgment header, which is known in the art.

Figure 16:
FIG. 16 is a diagram of a packet disconnect header according to one embodiment of the present invention.

Referencing FIG. 16, in one embodiment, a disconnect header 1643 may indicate a disconnection and the reason (such as, for example, via a reason code). The reason may be, for example, an error generated on the receiving node.

Figure 17:
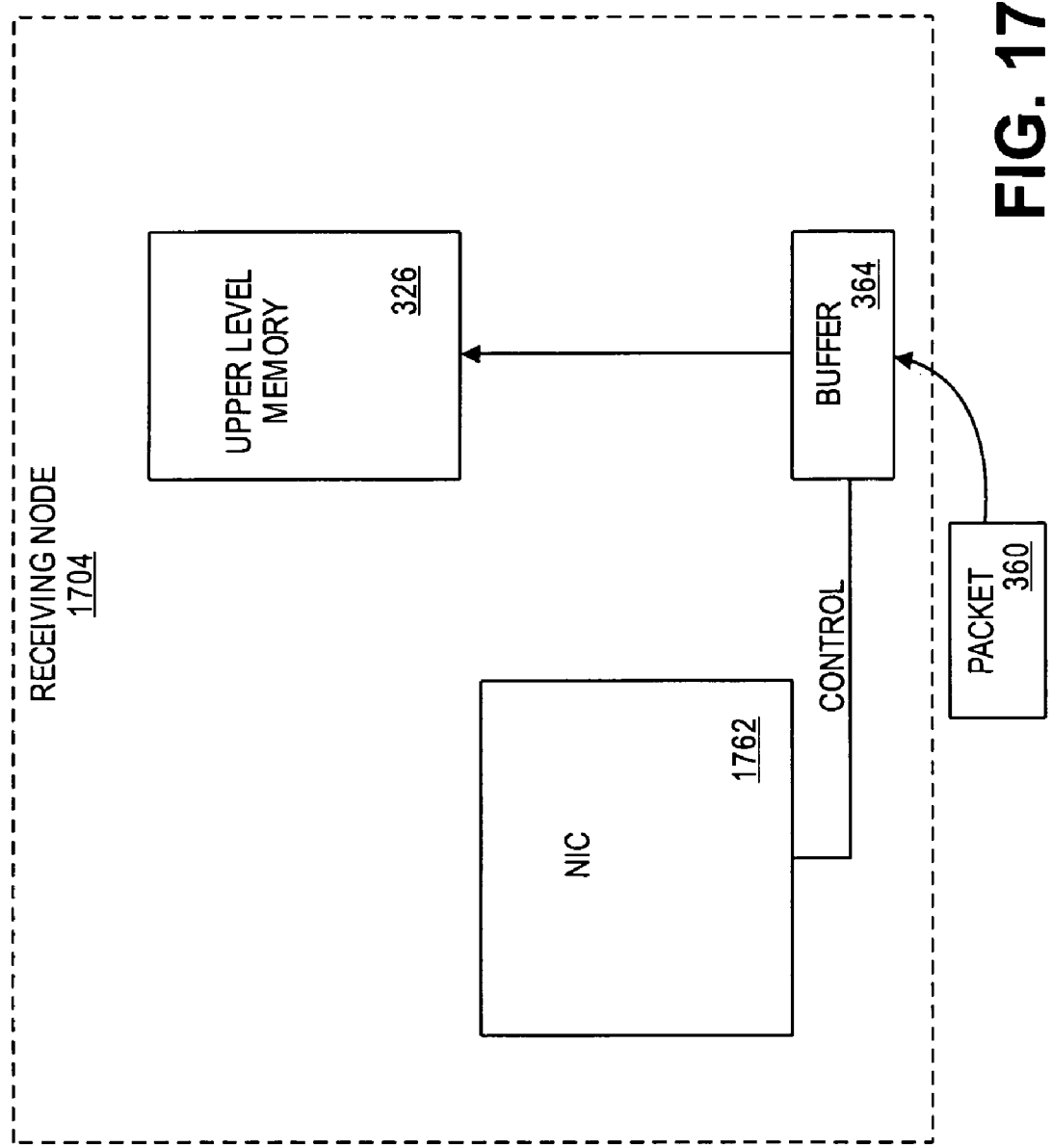
FIG. 17 is a block diagram of a portion of an exemplary node according to one embodiment of the present invention.

Referencing FIG. 17, in one embodiment, packet 360 may be received by a NIC 1762 of receiving node 1704, in which NIC 1762 comprises logic implemented in hardware (such as, for example, a processor, a core of a multi-core processor, an application-specific integrated circuit, a programmable logic device, a field programmable gate array or other logic hardware) to directly place received packet data into upper-level memory 326. This may remove a burden from a processor (not shown) of receiving node 1704. NIC 1762 may have a greater processing speed, as compared with a software implementation. The greater processing speed may reduce the need for buffers to receive and process incoming packets. In a further embodiment, incoming request packets may be received and processed in a single buffer 364, without a second buffer such as, for example, second buffer 366 of FIG. 3. In the case of a write request, the data portion of the request may be copied directly from single buffer 364 into pre-posted upper-level memory 326. In a particular hardware implementation, requests with data payloads may be received and processed at this single buffer 364 at the full rate of the physical layer.

In one embodiment, implementation of NIC 1762 may include providing the following support to NIC 1762 from the DT:

Locate queue pair state by queue pair number;
Maintain a receive sequence number state for each queue pair;
Locate an RDMA memory descriptor by queue pair number and a key or a message receive buffer memory descriptor by queue pair number.
Validate that inbound data is appropriate for the requested access rights and boundaries or valid for message receive buffer.
Generate interrupts for completed RDMA/receive data, non-data requests, and when non-sequential data has been received.

In one embodiment, NIC 1762 is assisted by having a DT driver, such as, for example, driver 146 of FIG. 1, perform packet formation. NIC 1762 may be limited to parsing and interpreting inbound packets and keeping received sequence number state. In a further embodiment, NIC 1762 may generate interrupts that result in a driver handling completed data transfers, non-sequential receives and all non data requests, such as, for example, RDMA read request, atomic requests, acknowledgments, selective negative acknowledgements, and disconnects.

In a further embodiment, since message send/receive may be used less than RDMA operations, tasks may be divided by having the NIC 1762 handle RDMA data types and leaving message send/receive data to software DMA by a driver. This may reduce NIC 1762 interaction with a receive queue.

Figure 18:
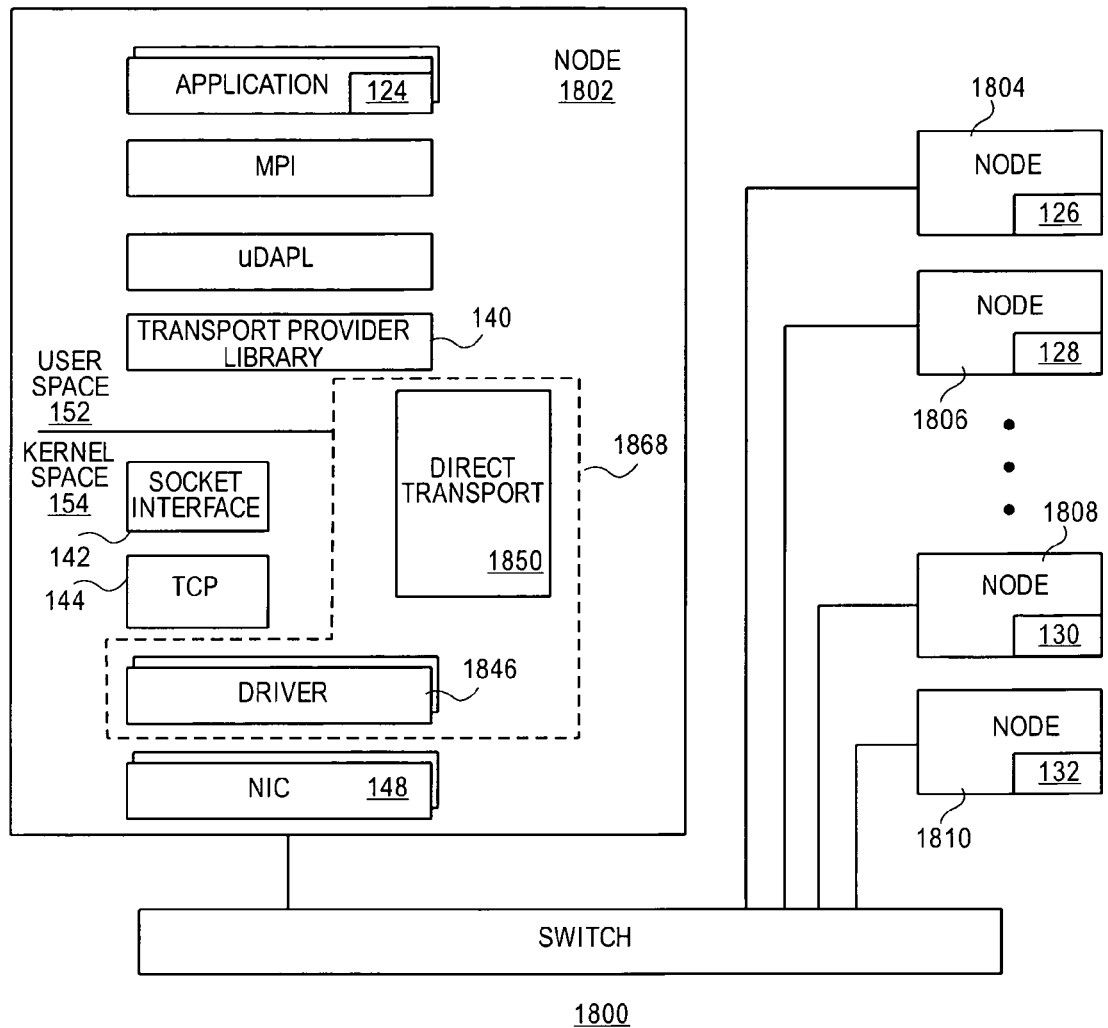
FIG. 18 is a block diagram of a network and an exemplary node according to one embodiment of the present invention.

Referencing FIG. 18, in one embodiment, a network 1800 may comprise nodes 1802-1810, with upper level memories 124-132. Node 1802 includes a Direct Transport ("DT") 1850 and a driver 1846 that are both implemented in a monolithic hardware logic 1868 (such as, for example, a processor, a core of a multi-core processor, an application-specific integrated circuit, a programmable logic device, a field programmable gate array or other logic hardware). Hardware logic 1868 may reside partly in kernel space 154, but interface with Transport Provider Library ("TPL") 140 in user space 152. Thus, TPL 140 may access hardware logic 1868 without the overhead of a system call, such as, for example, interrupts and context switches.

In a further embodiment, hardware logic may also interface directly with NIC 148. Hardware logic 1868 may expose at least some of its interface with NIC 148 to TPL 140 in user space. This may allow TPL 140 to directly see registers and other resources of NIC 148.

Further referencing FIG. 18, in processing an application-level request for remote direct access to posted upper-level memory of a remote node, TPL 140 may use TCP 144 socket interface 142 to establish a connection to a remote node, similar to the above discussion relative to FIG. 1. However, instead of TPL 140 making a system call to DT 1868, TPL 140 may perform a user-space call using an interface provided, in user space 152, by hardware logic 1868.

Figure 19:
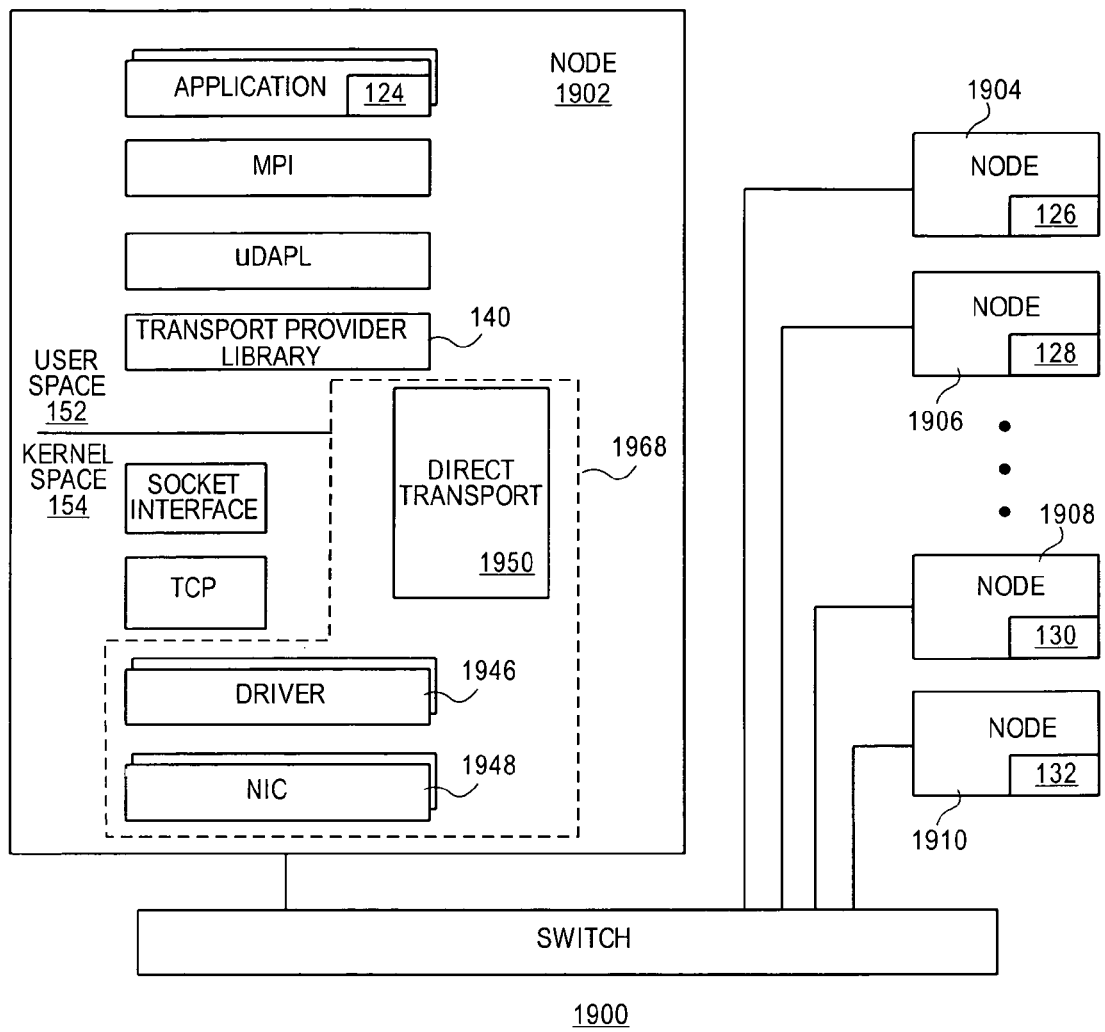
FIG. 19 is a block diagram of a network and an exemplary node according to one embodiment of the present invention.

Referencing FIG. 19, in another embodiment, a network 1900 comprises nodes 1902-1910 with upper level memories 124-132. Node 1902 comprises Direct Transport ("DT") 1950, driver 1946 and NIC 1948 all be implemented in hardware module 1968. It may be possible, in response to a request, to copy the data portion of a request directly from application 124 to a packet without intermediate copies of the data. The need for system calls may be further reduced. The hardware module 1968 may include a request handler, a packet generator, and a transmitter. In particular embodiments, hardware module 1968 may be a processor, a core of a multi-core processor, an application-specific integrated circuit ("ASIC"), a programmable logic device, a field programmable gate array ("FPGA") or other logic hardware.

Although hardware module 1968 resides partly in kernel space 154, user-mode logic, such as, for example, Transport Provider Library ("TPL") 140 of FIG. 19 may have access, in user-space 152, to request and completion queues—which may otherwise not be visible from user-space. This embodiment may enjoy very low latency because it may not require a user-kernel transition to post work requests or reap completions, may allow direct memory access directly to and from user memory and the wire, and may result in a single interrupt per application request. This embodiment may further achieve full bandwidth at small message sizes.

Implementing the above logic in hardware device 1968 may provide the following advantages:

- Significantly lowered interrupt frequency, perhaps reducing interrupts to one interrupt per request as opposed to an interrupt per network packet/frame.
- Zero copy receives that may decrease latency and CPU utilization along with enabling the support of very fast interconnects.
- User mode access to request/completion queues eliminating the latency incurred crossing the user/kernel boundary.

With the advent of multi-core processors, in one software embodiment there may be the ability to dedicate a processor to a specific task. This may be referred to as sequestered core. A sequestered core DT implementation may not require an investment in hardware logic in FIGS. 17, 18, and 19, but may be able to deliver many of the advantages of a hardware implementation.

Figure 20:
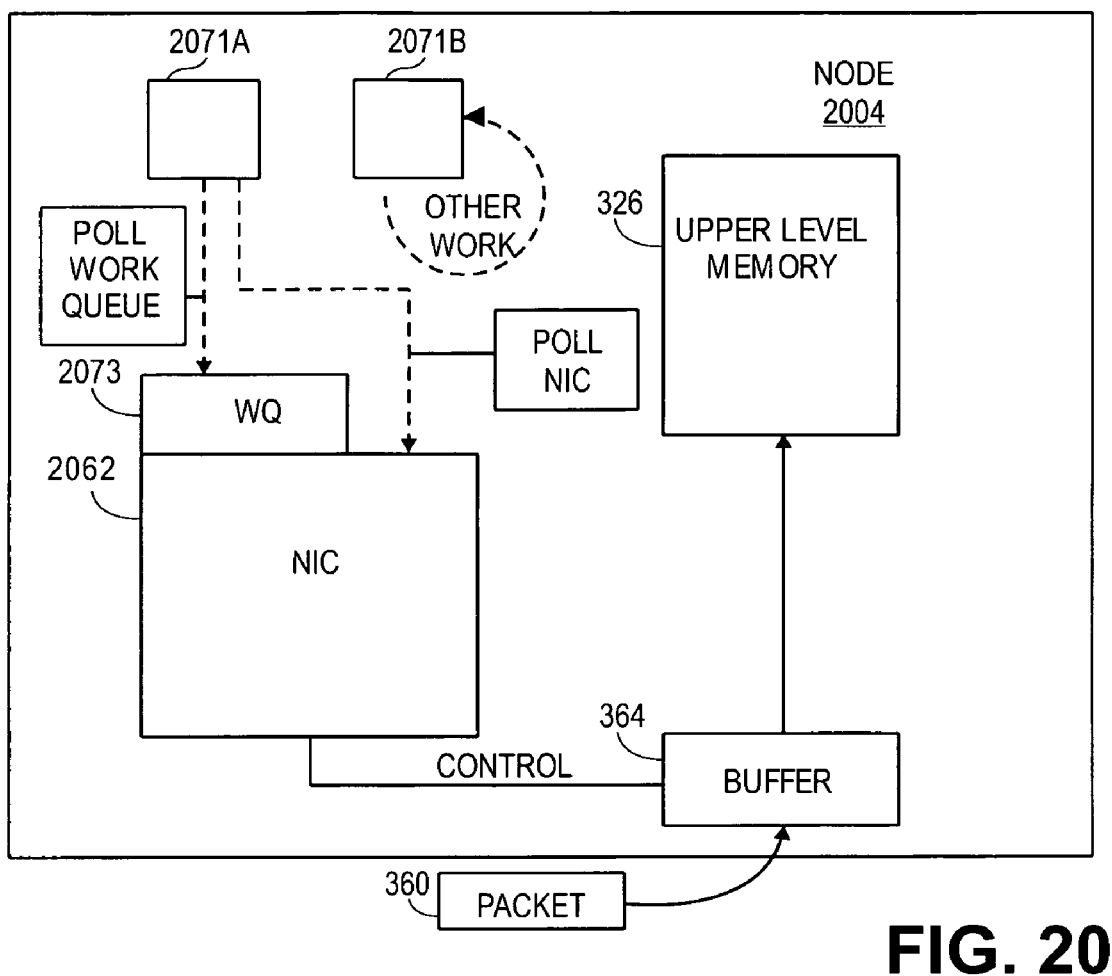
FIG. 20 is a block diagram of a multi-processor node according to one embodiment of the present invention.

Referencing FIG. 20, in one embodiment, a node 2004 includes at least a sequestered processor 2071A (such as, for example, a dedicated processor) and a non-sequestered processor 2071 B. The processors may specialize—for example, sequestered processor 2071A may poll NIC 2062 for inbound PDU's, poll work queue (WQ) 2073 in memory-mapped user-space to process any work posted by a user-mode application to the work queue 2073. The sequestered processor 2071A may also perform time-out processing—for example, checking to see if an unacknowledged packet should be retransmitted. Polling NIC 2062 may eliminate interrupt latencies. Polling the work queue 2073 may allow the posting of work from user space without the need for a doorbell interrupt or user/kernel mode transitions. Sequestered processor 2071A may perform the above without regard to operating system interface constraints. In contrast, non-sequestered processors, for example, processor 2071B, may be freed to perform other work, for example, general application and operating system operations.

The use of a sequestered processor may allow data received from packet 360 to be stored in only a single buffer 364 before being moved directly to application-level memory 326. Moreover, this data movement can be completely overlapped with application and operating system operations occurring on the non-sequestered processors, for example, processor 2071 B. Although the above discussion refers to a sequestered processor, in a particular implementation, a sequestered core of a multi-core processor, an application-specific integrated circuit, a programmable logic device, a field programmable gate array or other logic hardware may be used.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering or simultaneously, as one or ordinary skill would appreciate based at least on the teachings provided herein.

Embodiments of the present invention may be described in sufficient detail to enable those skilled in the art to practice the invention. Other embodiments may be utilized, and structural, logical, and intellectual changes may be made without departing from the scope of the present invention. Moreover, it is to be understood that various embodiments of the invention, although different, are not necessarily mutually exclusive. For example, a particular feature, structure, or characteristic described in one embodiment may be included within other embodiments. Accordingly, the detailed description is not to be taken in a limiting sense.

The foregoing embodiments and advantages are merely exemplary and are not to be construed as limiting the present invention. Those skilled in the art can appreciate from the foregoing description that the techniques of the embodiments of the invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of accessing memory on a network comprising:

generating, on a first node of the network, an application-level request to remotely access application-level memory on a second node of the network;

establishing a connection between the first node and the second node of the network in response to transmission of the request to remotely access the application-level memory;

sending the request in a packet over the network to the second node without making a copy of the request in kernel memory, the packet comprising a data link layer header and a header associated with a constrained usage model comprising a light-weight, reliable transport protocol, wherein sending the request in a packet comprises sending the request in a forwarded Ethernet protocol packet having, as a data integrity check, only an Ethernet cyclic redundancy check and without usage of a network security model, and wherein the data link layer header comprises an Ethernet protocol header and the packet does not have an Open Systems Interconnection Reference Model ("OSI") layer 3 header;

receiving the request in a buffer of the second node, wherein the second node is required to have buffer space available to receive requests, a error being generated upon receipt of any packet for which there is not sufficient buffer space; and providing access to the application-level memory, wherein the provision of access to the application level memory is based on information contained in the headers of the packet;

wherein the transport protocol performs flow control only with static window flow control allowing a configurable number of transported packets to be unacknowledged before stopping and waiting for acknowledgement, and performs packet acknowledgement only with piggy-backed acknowledgements.

2. The method of claim 1, wherein the connection between the first node and the second node is established by a transport provider library.

3. The method of claim 1, wherein the sending of the request in the packet comprises routing the packet only with a routing protocol native to a physical layer associated with the network and not using an OSI layer 3 routing protocol.

4. The method of claim 3, in which routing only with the protocol native to the physical layer comprises routing with Ethernet protocol.

5. The method of claim 1, in which the receiving of the request in a buffer is performed with logic implemented in hardware.

6. The method of claim 1, in which the memory access request is one of a group consisting of an RDMA (Remote Direct Memory Access) read request, an RDMA read response, and an RDMA write request.

7. The method of claim 1, in which the memory access request is one of a group consisting of a send request, an atomic memory fetch add request, and an atomic compare exchange request.

8. The method of claim 1, further comprising the second node receiving the request and issuing a response to the request, the response comprising one of a group consisting of an atomic response, an explicit acknowledgment, and a selective negative acknowledgement.

9. The method of claim 1, in which the first and second nodes comprise at least part of a high-performance computing enterprise cluster.

10. The method of claim 1, wherein the first node comprises a send queue, an inbound queue, and a receive queue.

11. The method of claim 10, wherein the first node is associated with a send data stream comprising packets carrying send messages and RDMA write data to the second node, and is associated with a response queue comprising packets copying RDMA read data and atomic read data from the second node.

12. The method of claim 1, wherein establishing the connection between the first node and the second node includes establishing a socket interface.

13. The method of claim 12, further comprising the request by-passing the socket interface once the connection is established.

14. The method of claim 13, wherein direct transport logic handles resource management, validation, data fragmentation and placement, retransmissions, and movement of data to or from memory.

15. A tangible computer readable medium having instructions which, when executed by a processing system, cause the system to:

generate, on a first node of the network, an application-level request to remotely access application-level memory on a second node of the network;

establishing a connection between the first node and the second node of the network in response to transmission of the request to remotely access the application-level memory;

send the request in a packet over the network to the second node without making a copy of the request in kernel memory, the packet to comprise a data link layer header and a header associated with a constrained usage model comprising a light-weight, reliable transport protocol, wherein sending the request in a packet comprises sending the request in a forwarded Ethernet protocol packet having, as a data integrity check, only an Ethernet cyclic redundancy check and without usage of network security model, the data link layer header comprises an Ethernet protocol header and the packet does not have an Open Systems Interconnection Reference Model ("OSI") layer 3 header;

receiving the request in a buffer of the second mode, wherein the second node is required to have buffer space available to receive requests, a error being generated upon receipt of any packet for which there is not sufficient buffer space; and providing access to the application-level memory, wherein the provision of access to the application-level memory is based on information contained in the headers of the packet;

wherein the transport protocol is to perform flow control only with static window flow control allowing a configurable number of transported packets to be unacknowledged before stopping and waiting for acknowledgement, and to perform packet acknowledgement only with piggy-backed acknowledgements.

16. The medium of claim 15, further comprising instructions that, when executed by the processing system, cause the system to perform operations comprising:

opening a connection between the first and second nodes of the network, the opening to be performed at least in part using a TCP socket interface, and the open connection, but not the interface, to be used to perform the sending over the network to the second node.

17. The medium of claim 15, the sending to be performed at least in part by a sequestered processor.

18. The medium of claim 15, the request comprising data to be written to the accessed memory of the second node, and the sending of the request including copying the data directly from application-level memory of the first node to the packet.

* * * * *